United States Patent [19]

Seymour

[11] Patent Number: 5,373,814

[45] Date of Patent: Dec. 20, 1994

[54] ANIMAL RESTRAINING DEVICE

[75] Inventor: Edwin L. Seymour, Knoxville, Tenn.

[73] Assignee: Phelps Engineering Company, Inc., Knoxville, Tenn.

[21] Appl. No.: 151,544

[22] Filed: Nov. 12, 1993

[51] Int. Cl.$^5$ .............................................. A01K 29/00
[52] U.S. Cl. ...................................................... 119/795
[58] Field of Search ................ 119/795, 797, 798, 769, 119/792, 770, 771, 712, 707, 708, 799

[56] References Cited

U.S. PATENT DOCUMENTS 2,491,951  12/1949  Buettner et al. ...................... 119/799
5,178,098  1/1993  Samberg ............................ 119/792 X

*Primary Examiner*—Gene Mancene
*Assistant Examiner*—Thomas Price

[57] ABSTRACT

The preferred embodiment of an animal restraining device has a plurality of flexible elongated members attached at one end to a snap hook, with the opposing ends attached to suction cups. This allows an animal, such as a dog or cat, to be restrained at any suitable surface capable of supporting a partial vacuum suction cup attachment. The animal is restrained by connecting a snap hook to the animal's collar, and the suction cups at the surface. By making the elongated members from elastomeric material, a non-jerking increasing restraining force is generated as the animal tries to move away, and the animal is soon taught to remain at a desired location. The invention eliminates required adjustment means and rigid framework of the prior art, thus providing a simpler device to manufacture while also allowing an animal to be restrained in a more natural and comfortable position.

6 Claims, 2 Drawing Sheets

ANIMAL RESTRAINING DEVICE

BACKGROUND OF THE INVENTION

1. Field of the Invention

The present invention relates to an animal restraining device that is useful for temporarily restraining animals to a suitable surface.

2. Description of the Prior Art

When bathing or grooming small animals such as pet dogs and cats, the animal often has a tendency to resist and will try to flee if given the opportunity. This necessitates the person performing this task to be vigilant, sometimes requiring one hand just to hold the animal in place.

Many restraining devices have been put forth that offer assistance for this problem. Notable is as described in U.S. Pat. No. 2,438,979 which offers a rigid frame and multiple harness device of a size that would fit a typical bath tub, and having friction pads that are wedged in place by screw adjustments. This device is limited to use in a bath tub of certain sizes only. The complexity and expense of manufacture of this device likely prevented it from obtaining widespread commercial acceptance.

U.S. Pat. No. 2,491,951 also offers a device that attaches to an animal's trunk. with a slidable wing nut adjustment for differing animal heights, and is held in place with a plurality of suction cups attached to a rigid frame. This device may also be used to lift the rear legs of an animal thus preventing movement while providing services such as medical attention.

The present invention offers improvements in that it can be easily put in place without the adjustments required by the prior art, and effectively provides a solution for temporarily restraining animals to a variety of surfaces. By eliminating the rigid frame noted in the prior art, the present invention also offers a solution that allows a more natural and comfortable restraint that is amiable to animals such as household pets.

SUMMARY OF THE INVENTION

According to the present invention preferred embodiment, the restraining function is accomplished by utilizing a snap hook means that is attached to the animal's collar. A plurality of flexible elongated members having suction cups at one end are also connected to the snap hook at the opposing end. Thus the animal may be restrained by its own collar by placing the suction cups on surfaces capable of forming a partial vacuum seal with said suction cups.

The preferred embodiment of the invention also utilizes an elastomeric material for the elongated members. This has the effect of providing a non-jerking increasing resistance as the animal tries to move away, while offering a comfortable setting when the animal remains at the desired location. Thus, an animal is quickly taught that it is best to remain where it is placed.

The present invention allows animals of various sizes and species to be restrained at a bath tub, sink, table top, floor, or any surface capable of supporting suction cup attachments. Placing said suction cups at a comfortable position for the particular animal being restrained serves as the only required adjustment, with no mechanical screw or bolted adjustments needed.

DETAILED DESCRIPTION OF THE PREFERRED EMBODIMENTS

Figure 1:
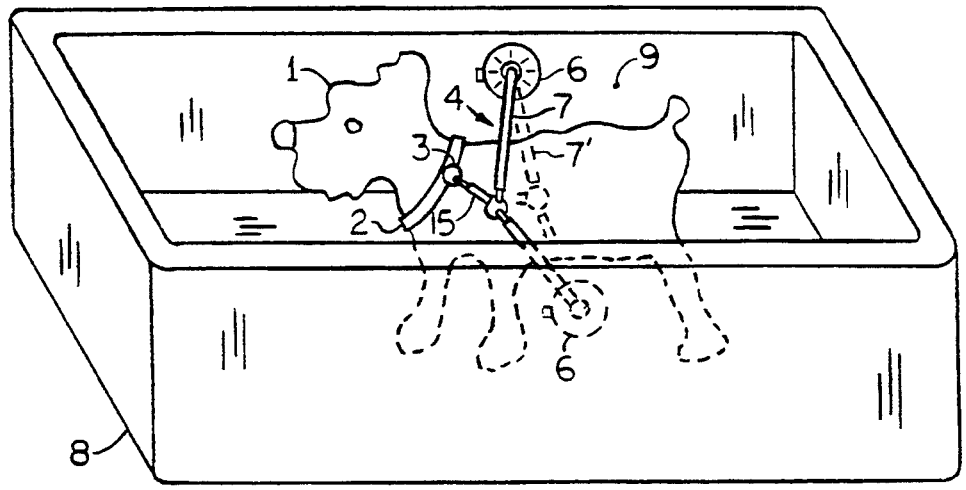
FIG. 1 is a perspective view of an animal being restrained in a bath tub with a two suction cup embodiment of the invention in place.

With reference to FIG. 1, an animal 1, such as a dog, is held in place with the present invention 4 as in a common bath tub 8. Commercially available snap hook means 15 are attached to a well known lease attachment means 3 of said animal's collar 2. The collar 2 may also be presented as part of a more complex assembly, such as a harness. A plurality of elongated members 7 are attached at one end to said snap hook means 15 thus providing a means for attaching one end of all of elongated members 7 to collar 2. Each elongated member 7 further has a suction cup 6, attached to its opposing end. Suction cups 6 are secured by means of a partial vacuum attachment to a suitable surface 9.

FIG. 1 illustrates the invention as it would appear when applying a restraining force when the animal 1 tries to move away. When the animal 1 returns to its desired location, the elongated members 7 will move to 7' and a smaller force will then be applied. By making elongated members 7 of an elastomeric material, such as latex or synthetic rubber, the force applied to the animal 1 will be steadily increasing as the animal 1 attempts to move away. This has the effect of teaching the animal 1 to remain at a desired location. An additional advantage of using elastomeric material is that elongated members 7 may also be stretched to reach a suitable surface 9 that is available. Elongated members 7 may also be made from a flexible material that is not elastomeric, but a jerking force will then be applied when an animal removes any slack between the suction cups 6 and snap hook means 15. FIG. 1 illustrates an embodiment of the invention having two elongated members 7 and two suction cups 6 that has been found to be sufficient for restraining smaller animals.

Figure 2:
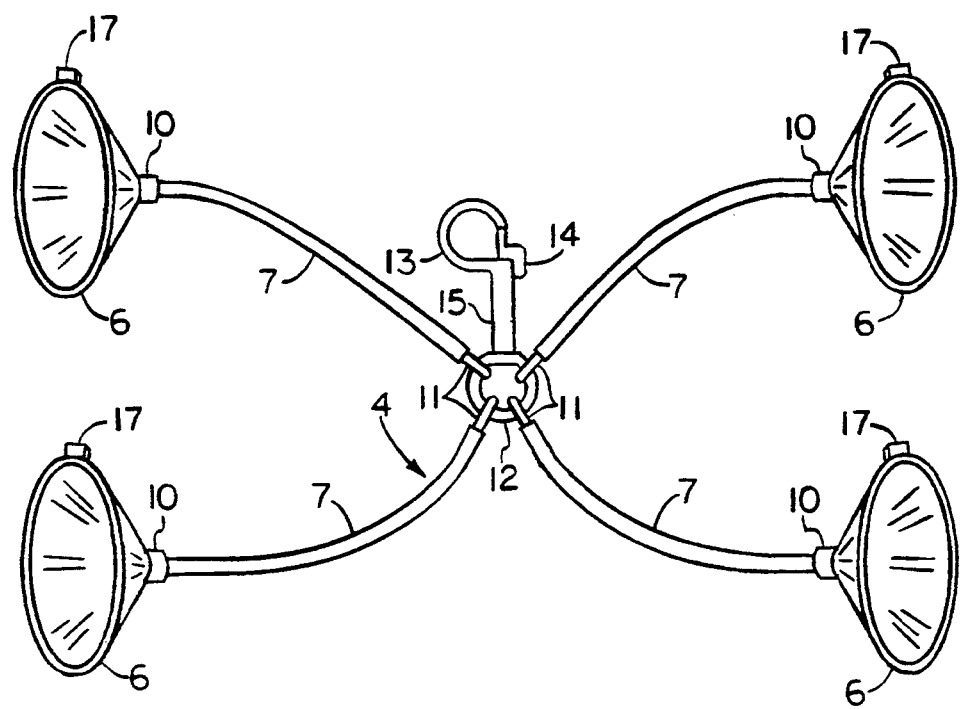
FIG. 2 is a perspective view of the invention having four suction cups, with common elements with that of FIG. 1 being numbered the same.

FIG. 2 illustrates an embodiment of the invention 4 having elements common to FIG. 1, but also having two additional elongated members 7 with attached suction cups 6. This embodiment is useful for restraining larger animals. The elongated members may be placed as shown in an approximate "X" configuration, which has the effect of generating a larger restraining force with a smaller movement of snap hook means 15, than would the two suction cup 6 embodiment of FIG. 1.

With further reference to FIG. 2, the commercially available snap hook means 15, having a hook 13, attaching ring 12, and member 14 allows selective attachment to, or removal from, an animal's collar by moving member 14. Member 11 is required for attaching the flexible elongated members 7 to attaching ring 12. Means 10 are further required for attaching elongated members 7 to suction cups 6. A tab 17, that is sometimes seen on a typical suction cup 6, allows breaking of the seal and easier removal of the suction cup 6 from a surface.

Figure 3:
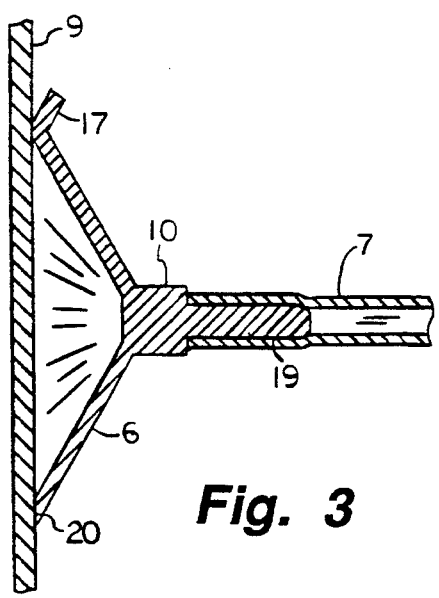
FIG. 3 is a sectional view illustrating means of attaching a tubular elongated member to a suction cup and a suitable surface.

FIG. 3 is a sectional view as would be observed when a suction cup 6 is attached to a suitable surface 9, and one end of an elongated member 7. A seal 20 is formed when the suction cup 6 is pressed against the surface 9 and the suction cup 6 remains attached by means of a partial vacuum that is formed by forcing air out of the space between the body of the suction cup 6 and surface 9. An optional tab 17 may be used to break the seal 20 allowing easier removal of the suction cup 6 from the surface 9. The surface 9 is indicated as planar, but is considered suitable if the requirement is met that a seal 20 is formed between said surface 9 and suction cup 6. The required seal 20 may also be formed on a surface that is not necessarily planar.

FIG. 3 also illustrates an attachment means to an elongated member 7 as it could appear if the elongated member 7 were of a tubular shape. Elongated member 7 is shown pressed against member 10 that further has a reduced cross section to engage the elongated member 7 at the interface surface 19. Surface 19 may retain the elongated member 7 by means such as friction, an adhesive, or may also be a well known barbed surface that is useful for holding tubular members.

Figure 4:
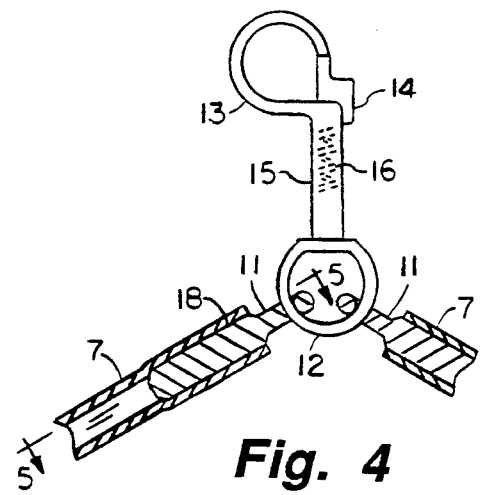
FIG. 4 is a sectional view illustrating a means of attaching a tubular elongated member to a snap hook.

FIG. 4 is a sectional view that would observed when one end of elongated members 7 are attached to a commercial snap hook means 15, having a hook 13, slidable member 14, attaching ring 12. Slidable member 14 typically has a spring means 16 that allows member 14 to remain against member 13 until engaging or disengaging from an animal's collar. A swivel means snap hook between the means 15 and attaching ring 12 is also a common feature that allows more flexibility of the assembly.

FIG. 4 also illustrates an attachment means to an elongated member 7 as it could appear if the elongated member 7 were of a tubular shape. Member 11 is indicated which wraps around attaching ring 12, and is further sized to fit inside an elongated tubular member 7 at the interface surface 18. Surface 18 has the same function as surface 19 of FIG. 3, and may retain the elongated member 7 by means such as friction, an adhesive, or may also be a well known barbed surface that is useful for holding tubular members.

Figure 5:
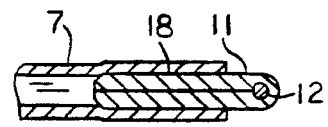
FIG. 5 is a sectional view taken from FIG. 4 further illustrating a means of attachment of a tubular elongated member to a snap hook.

FIG. 5 is a sectional view taken from FIG. 4 further illustrating a means whereby member 11 wraps around attaching ring 12 and engages elongated member 7 at surface 18.

Figure 6:
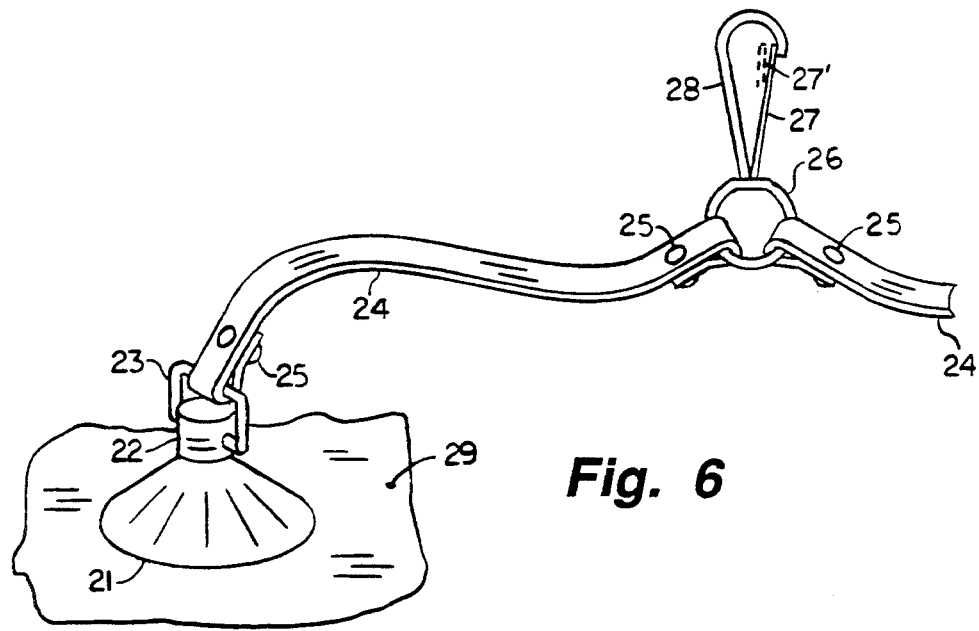
FIG. 6 is a perspective view illustrating an alternative embodiment having flat straps for the elongated members.

FIG. 6 is a perspective illustration of an alternative embodiment of the present invention. A different style of commercially available snap hook means is shown with hook 28 which is attached to the ring member 26. A cantilevered spring 27 is also attached to ring member 26 allowing the hook 28 to be engaged and disengaged from an animal's collar by deflecting spring 27 to 27'. A suction cup 21 is attached to a horizontal surface 29, and has members 22 and 23 forming an attachment means for a strap type elongated member 24 to be attached by wrapping around member 23 and held with a retaining member 25 such as a rivet. Similarly, the snap hook also has an attachment means formed by wrapping elongated member 24 around ring 26 and held with a retaining member 25.

From the foregoing description of the operation of the improved animal restraining device, it should be apparent that an invention is described which provides a technique for effectively restraining animals of various sizes without the cumbersome adjustments or rigid framework offered by the prior art, and useful for restraining an animal at many differing locations having surfaces suitable for suction cup attachments.

Having illustrated and described what is presently the preferred embodiments of the invention, it should be apparent to those skilled in the art that the preferred embodiments may be modified in arrangement and detail without departing from the principles of the invention which are intended to be illustrated but not limited by the disclosure. We therefore claim as our invention all such modifications as come within the true spirit and scope of the following claims:

What is claimed is:

1. An apparatus for restraining an animal having a collar to a surface capable of supporting suction cup attachments, said apparatus comprising:
   a plurality of suction cups;
   a plurality of flexible elongated members equal to the number of said plurality of suction cups;
   means for connecting one end of each of said flexible elongated members to a suction cup;
   means for attaching opposing ends of all of said flexible elongated members to said collar;
   whereby said animal may be restrained with said apparatus by forming a partial vacuum attachment to said surface by said plurality of suction cups.

2. The apparatus of claim 1 wherein said plurality of flexible elongated members are comprised of material having a returning force, said returning force increasing with the distance said animal attempts to move away from a restrained location.

3. The apparatus of claim 1 wherein said means for attaching opposing ends of all of said flexible elongated members to said collar comprises a snap hook.

4. An apparatus for restraining an animal having a collar to a plurality of surfaces capable of supporting suction cup attachments, said apparatus comprising:
   a plurality of suction cups;
   a plurality of flexible elongated members equal to the number of said plurality of suction cups;
   means for connecting one end of each of said flexible elongated members to a suction cup;
   means for attaching opposing ends of all of said flexible elongated members to said collar;
   whereby said animal may be restrained with said apparatus by forming a partial vacuum attachment to said plurality of surfaces by said plurality of suction cups.

5. The apparatus of claim 4 wherein said plurality of flexible elongated members are comprised of material having a returning force, said returning force increasing with the distance said animal attempts to move away from a restrained location.

6. The apparatus of claim 4 wherein said means for attaching opposing ends of all of said flexible elongated members to said collar comprises a snap hook.

* * * * *